INVENTOR.
William A. Eschenburg,
BY
Cromwell, Greist + Warden
Attys.

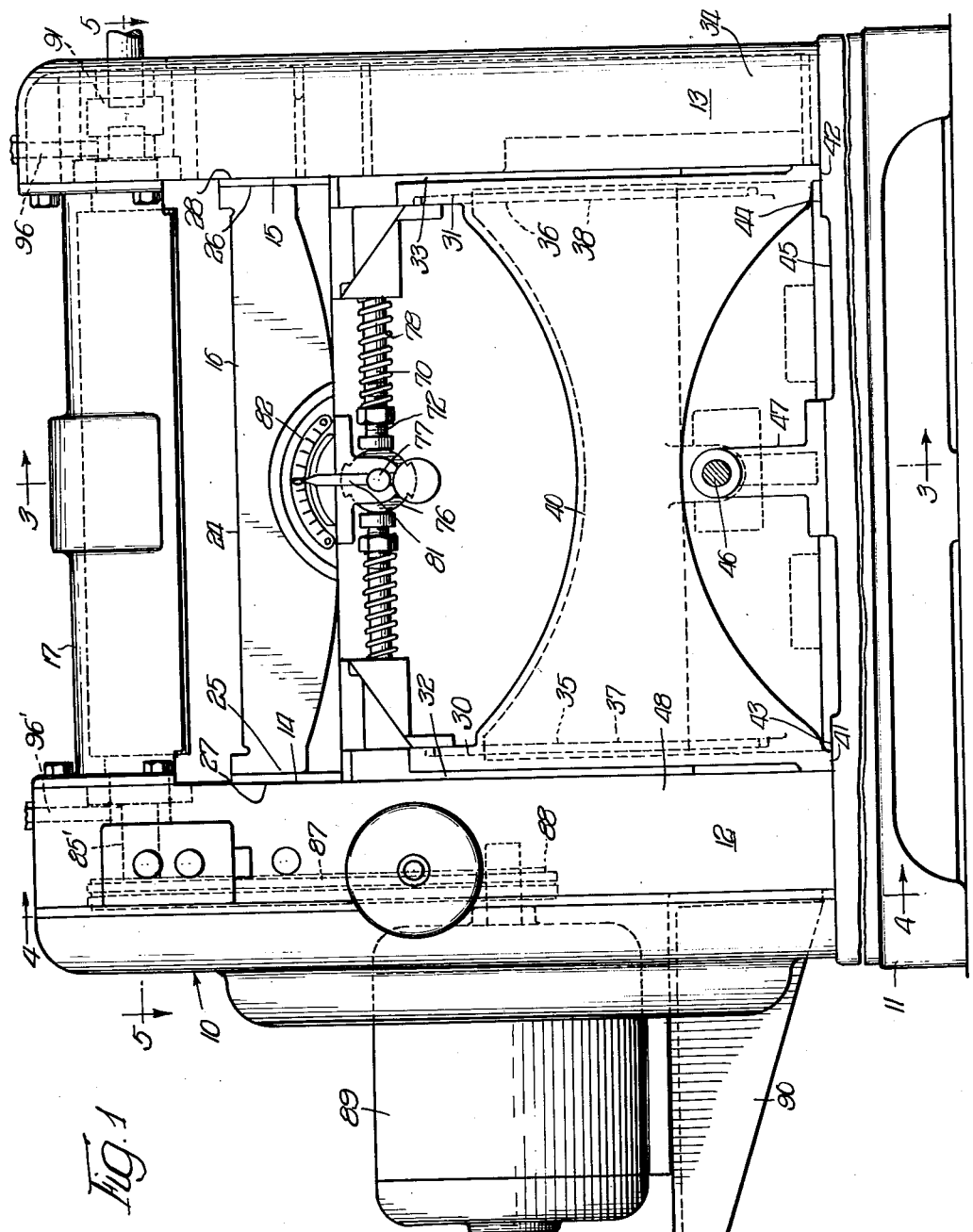

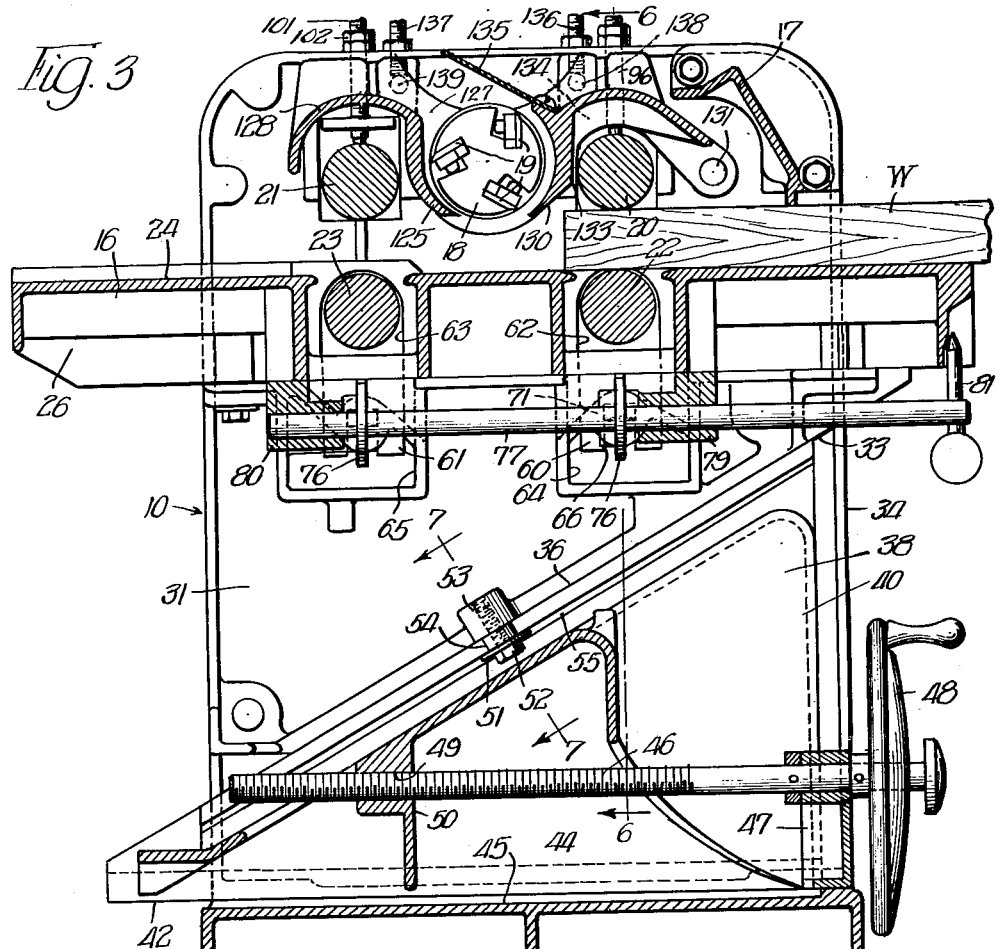
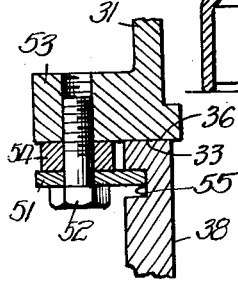

INVENTOR.
William A. Eschenburg,
BY
Cromwell, Greist & Warden
Attys.

United States Patent Office 3,067,788
Patented Dec. 11, 1962

3,067,788
POWER OPERATED PLANER WITH DRIVEN FEED MECHANISM AND ADJUSTABLE TABLE
William A. Eschenburg, Beloit, Wis., assignor to Yates-American Machine Company, Beloit, Wis., a corporation of Delaware
Filed Oct. 3, 1960, Ser. No. 60,198
11 Claims. (Cl. 144—117)

This invention relates to machinery for woodworking or similar purposes and is more particuarly concerned with improvements in a planer or surfacing machine.

It is a general object of the invention to provide improvements in a planer or surfacer for wood or similar materials of the type which is characterized by a rotatable cutter head mounted above a table on which a work piece is supported while it is moved beneath the cutter head by rotating feed rolls associated with the cutter head which improvements include independent driving mechanisms for the cutter head and for the feed rolls whereby operation of the machine is simplified and increased efficiency is obtained.

It is a more specific object of the invention to provide a surfacing machine which comprises an upright supporting frame, a cutter head mounted for rotation on a horizontal axis and extending between oppositely disposed, parallel side frame members, a vertically adjustable work supporting table beneath the cutter head, a pair of work feeding rollers on opposite sides of the cutter head, a power drive connected to the cutter head and a separate power drive connected to the feed rolls.

It is a still further object of the invention to provide in a wood planer a cabinet type, upright supporting frame having a cutter head journaled at its opposite ends in oppositely disposed side frame members, a pair of driven work feeding rollers journaled at their opposite ends in the side frame members on opposite sides of the cutter head, a horizontal work supporting table mounted for vertical movement beneath the cutter head, a pair of work engaging rollers carried in the table beneath the work feeding rollers and cooperating therewith in feeding the work, the table rollers being journaled in bearings which are slidably mounted in vertically extending recesses at the sides of the table and mechanism for varying the elevation of the bearings so as to adjust the work engaging rollers relative to the driven feed rollers for guiding the work beneath the cutter head.

It is another object of the invention to provide a wood surfacing machine comprising an upright supporting frame, a cutter head mounted in transversely extending relation in the frame above a vertically adjustable work supporting table, a pair of feed rollers on opposite sides of the cutter head which are mounted at their opposite ends in vertically movable bearings, means for adjusting the feed roller bearings to position the feed rollers in proper relation to the cutter head, and a drive for operating the feed rollers which comprises sprockets on the feed rollers and a connecting drive chain, a worm gear on one of the rollers, a worm engaging with the worm gear and mounted on a shaft having a drive pulley which is operative in a plane generally at right angles to the plane of the drive connecting the feed rollers, a drive motor adjustably supported on the frame and having a variable speed pulley, and a drive belt connecting the variable speed pulley with the drive pulley on the worm shaft.

These and other objects and advantages of the invention will be apparent from a consideration of the surfacing machine which is shown by way of illustration in the accompanying drawings wherein:

FIGURE 1 is a front elevation of a surfacer having embodied therein the principal features of the invention, with portions broken away;

FIGURE 3 is a longitudinal section taken on the line 3—3 of FIGURE 1;

FIGURE 7 is a fragmentary section taken on the line 7—7 of FIGURE 3, to an enlarged scale.

Figure 6:
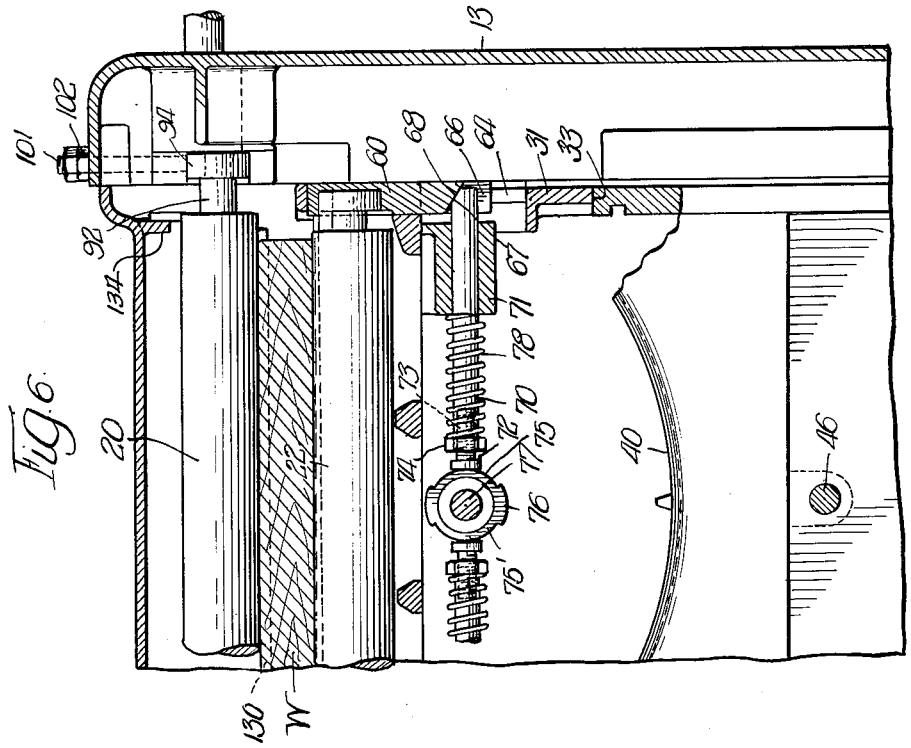
FIGURE 6 is a partial vertical section taken on the line 6—6 of FIGURE 3.
Figure 2:
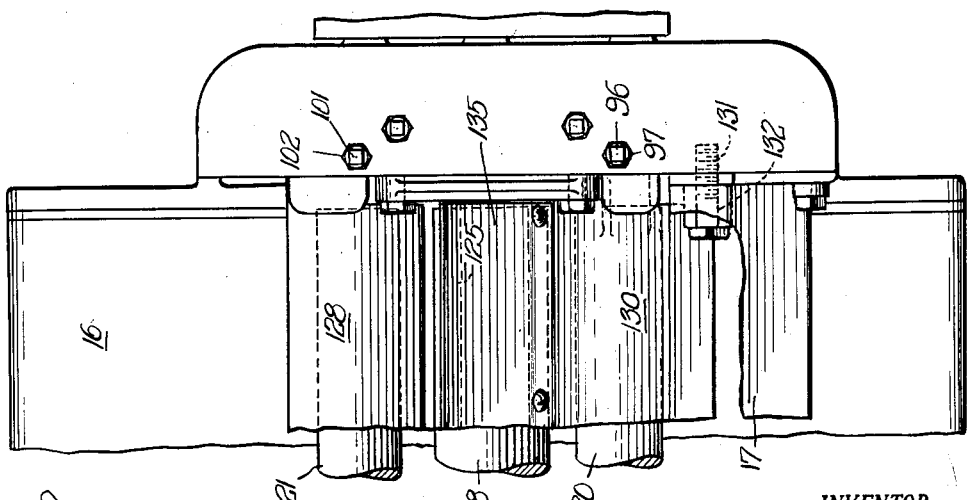
FIGURE 2 is a partial plan view of the surfacer.
Figure 4:
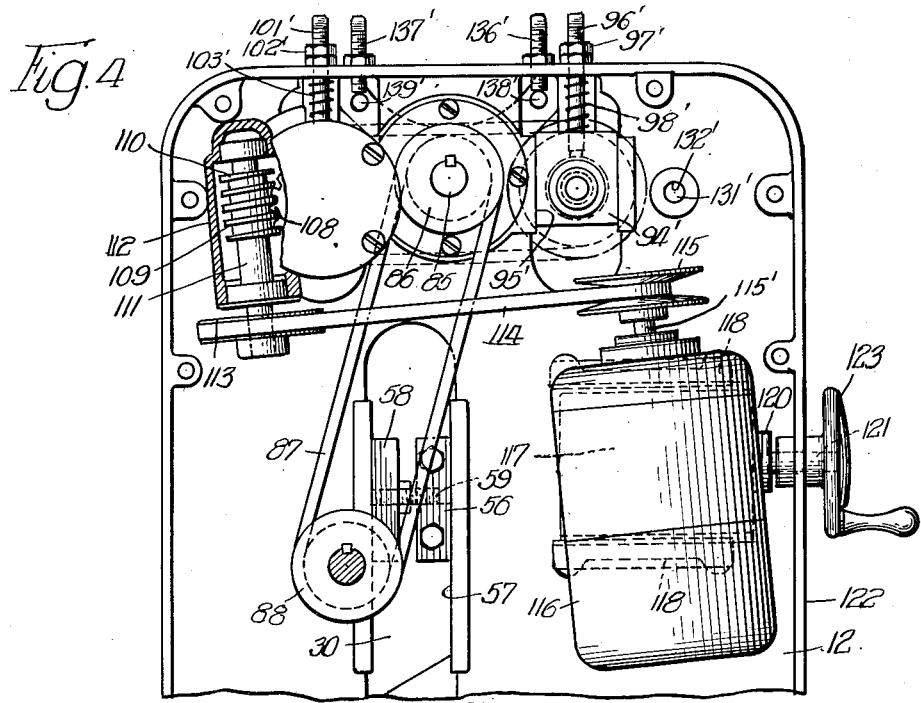
FIGURE 4 is a partial vertical section taken on the line 4—4 of FIGURE 1.

Referring to FIGURES 1 to 4 of the drawings, the invention is illustrated as embodied in a cabinet type planer or surfacer for wood or similar materials. The illustrated surfacer comprises an upright cabinet 10 having a base 11 and two oppositely disposed, laterally spaced, generally parallel, upright side frame members 12 and 13, which are of similar construction, and each of which is secured at its lower edge to the top of the base 11 so as to provide inner opposed faces 14 and 15 which are in spaced, parallel, vertical planes and which form tracks or ways for a vertica'ly traveling work supporting table 16. The two side frames 12 and 13 are also rigidly connected adjacent the top and the front of the machine by a cross brace 17, the latter having flanged ends which are bolted, as shown, or otherwise secured to the inside faces 14 and 15 of the side frame members 12 and 13. A cutter head which is in the form of a rotatable cylinder or drum 18 with peripherally projecting, axially extending cutter blades or knives 19 is supported in transversely extending re'ation at the upper ends of the side frame members 12 and 13 near the longitudinal center of the machine. A pair of work feeding rollers 20 and 21 are supported in relatively fixed, generally parallel relation with and on opposite sides of the cutter head 18. A coopera'ing pair of work engaging rollers 22 and 23 are carri:d in vertically adjustable relation on the table 16 beneath the cutter head 18 and in vertical alignment with the work feeding rollers 20 and 21, respectively.

The work supporting table 16 (FIGURES 1, 3 and 6) is arranged with its uppermost work receiving surface 24 in a generally horizontal, upwardly facing position and has depending flange formations 25 and 26 at opposite sides thereof which have their outer faces 27 and 28 machined to engage in sliding relation with the correspondingly machined inner faces 14 and 15 of the side frame members 12 and 13, respectively. A pair of triangular shaped, wedge-like supporting and adjusting plates 30 and 31 depend from the side flanges 25 and 26 of the table 16 with their lower faces or edges 32 and 33 forming tracks which are inclined upwardly towards the front side 34 of the machine and which engage with the inclined track forming upper edges or faces 35 and 36 on the side walls 37 and 38 of a wedge-like lower table adjusting member 40. The wedge member 40 is positioned between the side frame members 12 and 13 with the lower edges 41 and 42 of the side walls 37 and 38 engaging in sliding relation with track forming surface portions 43 and 44 of the top face 45 of the base frame member 11. The table adjusting wedge 40 is movable longitudinally of the machine by means of an adjusting screw shaft 46 which is journaled in an upright bearing bracket 47 secured on the face 45 of the base frame member 11 and carries at its rearward end a hand wheel 48, the shaft 46 being threaded at its other end and engaging in a threaded bore 49 in a cross web portion 50 depending adjacent the front end of the wedge member 40.

The upper wedge members or table side plates 30 and 31 are held with their lower edges in sliding relation on the inclined top track forming edges of the respective side plates 37 and 38 of the lower adjusting wedge member 40 by identical clamp and guide members. As shown in FIGURE 3, a small plate member 51 is secured in spaced relation beneath the lower track forming edge 33 of the side plate 31 by the stud bolt 52 which is engaged in a threaded bore in a boss 53 extending inwardly of the side plate. The plate 51 is spaced from the track face 33 by a spacing collar 54 and extends into a guide slot 55 in the inside face of the side wall 38 of the lower wedge member 40.

The work table 16 is held in a vertical path by a guide block 56 (FIGURE 4) which is secured to the outside face of the one depending side plate 30 on the table 16 and extends into a vertically extending guideway forming slot 57 in the side frame member 12. A cooperating guide block 58 is held in adjusted relation relative to the guide block 56 by a connecting bolt 59 and engages the other side edge of the guide slot 57 in the side frame member.

The work engaging rollers 22 and 23 which are carried by the table 16 are journaled at their opposite ends in pairs of identical end bearing support members 60 and 61 which are in the form of blocks and which are mounted in vertical sliding relation in vertically disposed pairs of recesses 62 and 63 in the side flanges 25 and 26 of the table 16 (FIGURES 3 and 6). The bearing blocks 60 and 61 extend at their lower ends into somewhat wider recesses 64 and 65 in the table side plates 30 and 31 which are aligned with the recesses 62 and 63 in the table flanges. Each of the bearing blocks 60 and 61 is provided, as shown in FIGURES 3 and 6, with an upwardly directed slot 66 at its lower end which slot terminates at an upwardly and inwardly slanted cam face 67. The cam face 67 is adapted to be engaged by a complementary cam face 68 on the outer end of a horizontally disposed adjusting pin 70. The pin 70 is slidably mounted in a horizontal bore in a boss 71 which extends inwardly of the side plate 31 and which carries at its inner end set screw 72 seated in an axially extending threaded socket 73 provided in the end of pin 70. The set screw 72 is locked in adjusted position by a jamb nut 74 and has its head engaging with the cam track 75 on a generally circular plate-like adjusting cam 76 mounted on a horizontally extending adjusting shaft 77. The pin 70 is urged toward the cam 76 by a compression spring 78. The shaft 77 is mounted in a pair of bearing brackets 79 and 80 which depend in longitudinally spaced relation from the lower side of the work table 16. Each of the bearing blocks 60 and 61 is arranged with a like adjusting mechanism and two identical cam plates 76 are carried on the shaft 77 with each of the cams 76 having two cam surfaces 75 and 75' arranged so that upon rotation of the shaft 77 the bearing blocks 60 and 61 at both sides of the table 16 are raised or lowered a corresponding amount. By adjusting the screws 72 the rolls 22 and 23 may be brought into parallelism with each other and by thereafter rotating the shaft 77, the opposite ends of the rolls 22 and 23 may be raised or lowered. The shaft 77 extends forwardly to the front face 34 of the machine and carries a pointer arm 81 which also serves as a handle for rotating the shaft 77. A scale 82 is provided on the front flange of the table 16 for cooperation with the pointer 81 to indicate the elevation of the rollers 22 and 23 relative to the work table surface.

Figure 5:
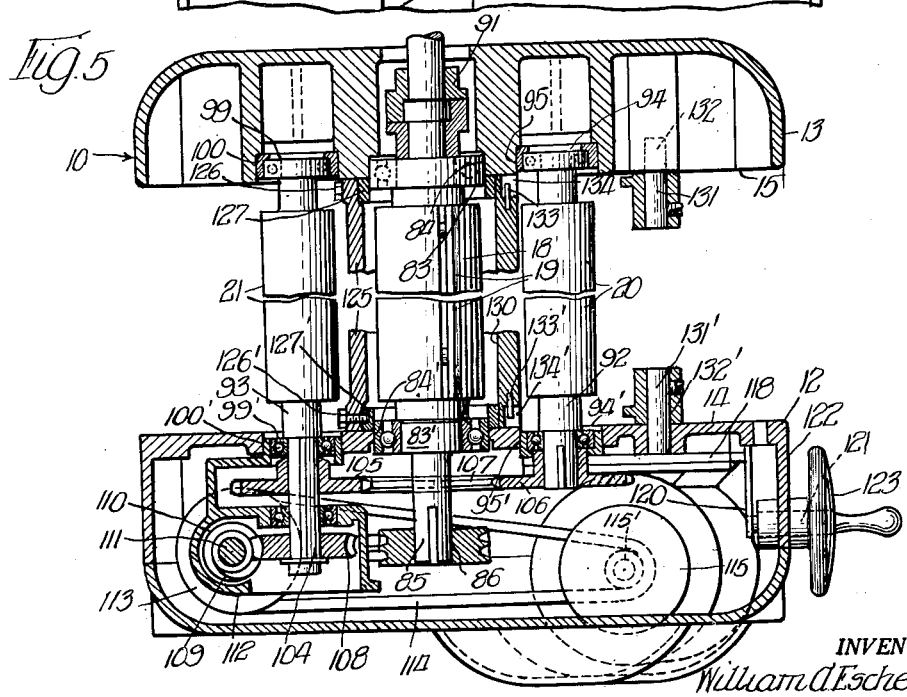
FIGURE 5 is a horizontal section taken on the line 5—5 of FIGURE 1, with portions broken away.

The cutter head 18 is supported by suitable bearings 83 and 83' (FIGURE 5) at its opposite ends which are received in bearing recesses 84 and 84' provided in the inner faces of the side frame members 12 and 13. The cutter head 18 has a shaft extension 85 extending outwardly in the frame side member 12 which carries a drive pulley 86 and the latter is connected by multiple driving belts 87 with the output pulley 88 on a drive motor 89. The motor 89 may be conveniently supported on a bracket 90 extending laterally of the side frame member 12. Alternatively, as indicated in FIGURES 1 and 3, a coupling 91 may be provided at the other end of the cutter head 18 for connection to a motor (not shown) suitably supported at that side of the machine so as to provide the cutter head with a direct drive power connection.

The driven feed rollers 20 and 21 (FIGURES 3, 4 and 5) are mounted on shafts 92 and 93, respectively. The shaft 92 for infeed roller 20 is journaled at its opposite ends in bearing supporting blocks 94 and 94' which are slidably mounted in suitable recesses 95 and 95' in the inner faces 14 and 15 of the side frame members 12 and 13. The bearing blocks 94 and 94' are connected for vertical adjustment to the lower ends of adjusting bolts 96 and 96' (FIGURES 1 and 4), each of which extends through the upper wall of its respective side frame member and carries suitable jamb nuts 97 with a compression spring 98 extending between the upper wall of the side frame member and the upper surface of the bearing block, so that roller 20 is adjustable at each end thereof and is held in spring pressed relation against the work piece W as it advances the latter beneath the same.

The shaft 93 for the outfeed roller 21 is journaled in bearing supporting blocks 99 and 99' (FIGURE 5) which are slidably mounted in recesses 100 and 100' in the inside faces 14 and 15 of the side frame members 12 and 13 in the same manner as the shaft 92 with vertical adjusting screws 101 and 101' having jamb nuts 102 and 102' and compression springs 103 and 103'. The shaft 93 has an end extension 104 (FIGURE 5) on which a sprocket 105 is mounted. The sprocket 105 is connected with a like sprocket 106 on the end of the shaft 92 by a drive chain 107 so that the two rollers 20 and 21 are rotated simultaneously.

The roller 21 is driven by a power connection at the end of the shaft extension 104. The shaft extension 104 carries a gear 108 which is in toothed engagement with the worm 109 on a worm and shaft assembly 110. The shaft 111 of the assembly 110 is journaled at its opposite ends in a housing 112 which is integrally connected with or fixed on the bearing blocks 99' and moves as a unit thereof. The shaft extension 104 is mounted in the bearing in block 99' and an aligned bearing in the housing so that the shaft extension 104 may rotate relative to the housing 112 without interference due to any vertical movement of housing 112. The shaft 111 of the worm and shaft assembly 110 is positioned so that it extends in a generally vertical direction and carries at the lower end thereof, which projects outside of the housing 112, a pulley 113 which is connected by a drive belt 114 with a variable speed expansion type pulley 115 of conventional construction on the power output shaft 115' of a drive motor 116.

The drive motor 116 is mounted on a base plate 117 which is slidably supported for movement longitudinally of the machine in a pair of spaced guideway forming members 118 secured on the frame member 12. The motor support plate 117 carries an angular bracket 120 at the forward edge on which a relatively short threaded shaft 121 is mounted. The shaft 121 extends through the front wall 122 of the side frame member 12 with its end received in a threaded bore in a hand wheel 123 which has its hub journaled in the front wall 122 of the frame member for adjusting the longitudinal position of the plate 117 and the distance between the shaft 111 and the power output shaft 115' of the motor 116 thereby varying the speed of operation of the rollers 21 and 22 through operation of the variable speed pulley 115.

A pressure bar 125 (FIGURES 2, 3 and 5) is associated with the cutter head 18 which extends along the outfeed side of the cutter head 18 and is bolted at its opposite ends, at 126 and 126', to supporting ring members 127 and 127' which are rotatably or pivotally mounted on the bearings 83 and 83' for the cutter head 18. The pressure bar 125 has a curved top flange portion 128 which extends as a guard over the outfeed roller 21.

A chip breaker 130 (FIGURES 2, 3 and 5) extends along the infeed side of the cutter head 18 and is mounted at opposite ends on pivot pins 131 and 131' which extend through apertures in the flanged ends of the chip breaker 130 and are seated in bores 132 and 132' provided in the side frame members 13 and 12, the pins being held in position by set screws or the like. The chip breaker 130 is provided at its opposite ends with pins 133 and 133' which engage in slots 134 and 134' provided in the ring members 127 and 127'. A guard plate 135 is carried on the chip breaker 130 and extends above the cutter head 18.

The supporting ring members 127 and 127' on which the pressure bar 125 is carried are held against rotation on the bearings 83 and 83' by means of pairs of adjusting screws 136, 136' and 137, 137' (FIGURES 3 and 4) which extend through the top walls of the respective side frame members 12 and 13 and engage at their lower ends with outwardly extending pins 138, 138' and 139, 139' on the upper corners of the ring members 127 and 127' so that by adjustment of the screws 136, 136' and 137, 137' the position of the pressure bar 125 can be changed relative to the cutting plane of the cutter head 18.

In using the machine the table rolls 22 and 23 are initially adjusted to level the same and bring their uppermost peripheral path into a plane slightly above the table surface 24. The top feed rolls 20 and 21 are initially adjusted according to the depth of cut desired by the cutter head 18. This adjustment need not be thereafter changed since the springs 101 will permit sufficient vertical movement of the feed rolls to accommodate normal variations in the thickness of the work pieces or unevenness on the surfaces thereof. After initial adjustment of the rolls the table 16 is adjusted vertically to accommodate the work piece W.

As the work pieces are fed to the machine, the infeed rollers 20 and 22 cooperate to advance the work piece W across the table surface 24 to the cutter head 18. The cutter head 18 is independently driven by the motor 89 so as to produce the desired speed for most efficient cutting. The infeed and outfeed rollers 20 and 21 are driven independently of the cutter head by operation of the drive motor 116 which may be adjusted to vary the speed of the feed of the material without affecting in any way the operation of the cutter head. The two motors 89 and 116 are connected into the same supply circuit and arranged to be stopped simultaneously when it is desired to discontinue the cutting operation. The feed rollers 20 and 21 are allowed to come to a stop independently of the cutter head 18 with the latter being allowed to coast to a stop so that the machine can be constructed without the need for any braking mechanism.

While particular materials and specific details of construction have been referred to in describing the form of the machine illustrated, it will be understood that other materials and different details of construction may be resorted to within the spirit of the invention.

I claim:
1. A wood surfacing machine comprising an upright frame having oppositely disposed side frame members, a work supporting table mounted for vertical movement between the side frame members, means for raising and lowering said table, a cutter head journaled at its opposite ends in said side frame members above said table, a pair of work feeding rollers on opposite sides of said cutter head for advancing work pieces across said work table and beneath said cutter head, said rollers being mounted on shafts having their opposite ends journaled in bearing blocks which are mounted for vertical adjustment in said side frame members, said feeding roller shafts being extended at one end, a drive connection between the ends of said shafts for rotating the shafts in unison, a worm gear on one of said shaft ends, a worm and shaft assembly housing connected to the bearing block in which said one shaft end is journaled, a worm and shaft assembly mounted in said housing with the worm engaging said worm gear, a drive motor mounted on said frame and connected in driving relation with said cutter head, a second drive motor mounted on said frame and means forming a variable speed connection between said second motor and the shaft of said worm and shaft assembly for rotating said feed rollers independently of the drive for said cutter head.

2. A wood surfacing machine comprising an upright frame having oppositely disposed side frame members, a work supporting table mounted for vertical movement between the side frame members, means for raising and lowering said table, a cutter head journaled at its opposite ends in said side frame members above said table, a drive motor connected to said cutter head, a pair of work feeding rollers on opposite sides of said cutter head for advancing work pieces across said work table and beneath said cutter head, said rollers being mounted on shafts having their opposite ends supported in bearings mounted for vertical adjustment in said side frame members, said feeding roller shafts being extended at one end, a drive connection between the ends of said shafts for rotating the shafts in unison, a worm gear on one of said shaft ends, a worm and shaft assembly housing supported on said one shaft end, a worm and shaft assembly mounted in said housing with the worm engaging said worm gear, a drive motor having an output shaft adjustably mounted on said frame and means forming a variable speed connection between the output shaft of said drive motor and the shaft of said worm and shaft assembly for rotating said feed rollers independently of said cutter head.

3. A surfacing machine for wood or similar material comprising a supporting frame having upstanding, oppositely disposed side members, a work supporting table mounted for vertical movement between said frame side members and having an upwardly facing surface, means for raising and lowering said table, a cutter head rotatably mounted on a fixed axis above the table, a pair of driven work feeding rollers mounted on opposite sides of said cutter head with their opposite ends journaled in said frame side members, a pair of cooperating work feeding rollers supported on said table, said table rollers having their opposite ends journaled in bearing support members, said work table having recesses in which said bearing support members are vertically slidable, a pair of cross bars movably supported beneath said table with their outer ends having a tapered surface engaging beneath said bearing support members, a rotatable cam shaft extending longitudinally beneath said table, and cam members on said cam shaft engaging the inner ends of said cross bars, whereby said bearing support members may be adjusted vertically by rotation of said cam shaft.

4. A machine as recited in claim 3 and each of said cross bars being extensible so as to independently adjust each of said bearing members.

5. A surfacing machine for wood or similar material comprising a supporting frame having upstanding, oppositely disposed side members, a work supporting table mounted for vertical movement between said frame side members and having an upwardly facing surface, means for raising and lowering said table, a cutter head rotatably mounted on a fixed axis above the table, a pair of driven work feeding rollers mounted on opposite sides of said cutter head with their opposite ends journaled in said frame side members, a pair of cooperating work feeding rollers supported on said table, said table rollers having their opposite ends journaled in bearing support members, said work table having recesses in which said bearing support members are vertically slidable, each of said bearing support members having a downwardly facing tapered surface, a cross bar slidably mounted beneath said table and having an upwardly facing tapered surface on its outer end for engaging with the tapered surface on said bearing support member, a cam shaft rotatably mounted on said table and a cam on said cam shaft for engaging with said cross bar to move the latter toward and from said bearing support member.

6. A wood surfacing machine comprising a supporting frame having upstanding, oppositely disposed frame side members, a work supporting table mounted for vertical movement between said frame side members, means for raising and lowering said table, a cutter head mounted on said frame side members for rotative movement on a fixed axis above the table, upper and lower work feeding rollers mounted in paired relation on opposite sides of said cutter head, the upper feeding rollers having their opposite ends journaled in bearing block members mounted for vertical sliding movement on said frame side members, means connecting the upper feeding rollers in driving relation, one of said upper feeding rollers having a shaft extension at one end thereof, a worm gear on said shaft extension, a worm and shaft assembly mounted in a housing connected to the bearing block adjacent said shaft, said shaft extension being journaled in a side wall of said housing, a worm on said worm and shaft assembly connected in driving relation with said worm gear, a drive motor mounted on said frame and connected in driving relation with said worm and shaft assembly, and a second drive motor mounted on said frame and connected in driving relation with said cutter head.

7. A wood surfacing machine comprising a supporting frame having upstanding, oppositely disposed frame side members and a lower base member, a work supporting table mounted for vertical movement between said frame side members, a cutter head rotatably mounted above the table, a pair of upper work feeding rollers on opposite sides of said cutter head, said rollers having their opposite ends journaled in said frame side members, a pair of cooperating lower work feeding rollers having their opposite ends journaled in said work table, drive means mounted on said frame and connected in driving relation with said cutter head and said work feeding rollers for rotating said cutter head and said work feeding rollers, said work table having downwardly facing, inclined surfaces on the bottom thereof, a wedge-like adjusting member supported for horizontal movement on said base member and having upwardly facing, inclined surfaces mating with the downwardly inclined bottom surfaces on the work table, and a single longitudinally extending adjusting screw journaled in a fixed portion of said base member and having screw threaded engagement with said adjusting member.

8. A surfacing machine for wood or similar material comprising a supporting frame having upstanding, oppositely disposed side members, a work supporting table mounted for vertical movement between said frame side members and having an upwardly facing surface, means for raising and lowering said work table, a cutter head rotatably mounted on a fixed axis above the work table, a pair of driven work feeding rollers mounted on opposite sides of said cutter head with their opposite ends journaled in said frame side members, means for adjusting the vertical position of said work feeding rollers including resilient members permitting said work feeding rollers to yield upwardly, a pair of cooperating work feeding rollers supported on said table, said table supported rollers having their opposite ends journaled in bearing support members, said work table having recesses in which said bearing support members are vertically slidable, a pair of cross bars movably supported beneath said work table with their outer ends having means connected with said bearing support members for raising and lowering said bearing support members in response to movement of said cross bars, a rotatable cam shaft extending longitudinally beneath said work table, and cam members on said cam shaft engaging the inner ends of said cross bars, whereby said bearing support members may be adjusted vertically by rotation of said cam shaft.

9. A surfacing machine for wood or similar material comprising a supporting frame having upstanding, oppositely disposed side members, a work supporting table mounted for vertical movement between said frame side members and having an upwardly facing surface, means for raising and lowering said work table, a cutter head rotatably mounted on a fixed axis above the work table, a pair of upper work feeding rollers mounted on opposite sides of said cutter head with their opposite ends supported in said frame side members, means for adjusting the vertical position of said upper work feeding rollers including resilient members permitting upward movement thereof, a pair of cooperating lower work feeding rollers supported on said work table, said lower work feeding rollers having their opposite ends journaled in bearing support members, said work table having recesses in which said bearing support members are vertically slidable, cross bars supported on said work table for sliding movement beneath said lower work feeding rollers, said cross bars having means at their outer ends connected with said bearing support members for raising and lowering said bearing support members in response to movement of said cross bars, a shaft extending longitudinally beneath said work table, and cam members on said shaft engaging said cross bars which cam members are adapted to move said cross bars so as to selectively raise or lower said bearing support members thereby to adjust the same vertically.

10. A wood surfacing machine comprising a supporting frame having upstanding, oppositely disposed frame side members, a work supporting table mounted for vertical movement between said frame side members, means for raising and lowering said work table, a cutter head mounted on said frame side members for rotative movement on a fixed axis above the work table, upper and lower work feeding rollers mounted in paired relation on supporting shafts disposed on opposite sides of said cutter head, the upper feeding rollers having the opposite ends of their supporting shafts journaled in bearing block members mounted for vertical sliding movement on said frame side members, chain drive means connecting the upper feeding roller shafts in driving relation, one of said upper feeding roller shafts having an extension at one end thereof, a worm gear on said shaft extension, a housing connected to the bearing block member adjacent said feeding roller shaft, said shaft extension being journalled in a side wall of said housing, a worm supporting shaft journaled in said housing, a worm on said worm supporting shaft in driving relation with said worm gear, a drive motor mounted on said supporting frame and connected in driving relation with said worm supporting shaft, and a second drive motor mounted on said supporting frame and connected in driving relation with said cutter head.

11. A wood surfacing machine comprising a supporting frame having upstanding, oppositely disposed frame side members, a work supporting table mounted for vertical movement between said frame side members, means for raising and lowering said work table, a cutter head mounted on said frame side members for rotative movement on a fixed axis above the work table, upper and lower work feeding rollers mounted on supporting shafts disposed on opposite sides of said cutter head, the upper feeding rollers having the opposite ends of their supporting shafts journaled in bearing block members which bearing block members are mounted for vertical sliding movement on said frame side members, drive means connecting the upper feeding roller shafts in driving relation, one of said upper feeding roller shafts having a worm gear at one end thereof, a housing mounted on the bearing block member adjacent said one roller shaft, a worm supporting shaft journaled in said housing, a worm on said worm supporting shaft engaging in driving relation with said worm gear, a drive motor adjustably mounted on said supporting frame, means connecting said drive motor in driving relation with said worm supporting shaft, and a second drive motor mounted on said supporting frame and connected in driving relation with said cutter head.

References Cited in the file of this patent

UNITED STATES PATENTS

| | | |
|---|---|---|
| 673,049 | Dupre | Apr. 30, 1901 |
| 693,559 | Mershon | Feb. 18, 1902 |
| 750,125 | Ross | Jan. 19, 1904 |
| 757,963 | Rawson | Apr. 19, 1904 |
| 899,143 | Thomas et al. | Sept. 22, 1908 |
| 1,302,717 | Sawyer | May 6, 1919 |
| 1,651,013 | Buss et al. | Nov. 29, 1927 |
| 2,449,201 | Buss | Sept. 14, 1948 |
| 2,694,424 | Buss | Nov. 16, 1954 |
| 2,792,036 | Buttke | May 14, 1957 |
| 2,998,040 | Patterson | Aug. 29, 1961 |